United States Patent
Kraft et al.

(10) Patent No.: US 7,224,959 B2
(45) Date of Patent: May 29, 2007

(54) MOBILE PHONE BUSINESS ADMINISTRATION TOOL

(75) Inventors: Christian Kraft, Hvidovre (DK); Mikko Viitanen, Espoo (FI); Juha Pinomaa, Kaunianinen (FI); Lone Tram Soerensen, Roskilde (DK); Henning Lunøe, Køge (DK); Povl Koch, Copenhagen (DK); Claus Aagaard Pedersen, Copenhagen OE (DK); Jens Benner, Copenhagen OE (DK); Anand Narang, Hellerup (DK); Mikko E. Makinen, San Diego, CA (US)

(73) Assignee: Nokia Corporation, Espoo (FI)

( * ) Notice: Subject to any disclaimer, the term of this patent is extended or adjusted under 35 U.S.C. 154(b) by 333 days.

(21) Appl. No.: 10/729,669

(22) Filed: Dec. 5, 2003

(65) Prior Publication Data
US 2005/0124321 A1    Jun. 9, 2005

(51) Int. Cl.
*H04M 11/00*    (2006.01)

(52) U.S. Cl. .................. 455/407; 455/408; 455/456.3; 455/414.1

(58) Field of Classification Search ............. 455/456.3, 455/414.1, 411, 556, 90, 556.1, 556.2
See application file for complete search history.

(56) References Cited

U.S. PATENT DOCUMENTS

| 5,572,653 | A * | 11/1996 | DeTemple et al. | 345/501 |
| 7,072,672 | B1* | 7/2006 | Vanska et al. | 455/456.3 |
| 2001/0008000 | A1* | 7/2001 | Kikinis et al. | 710/100 |
| 2001/0044321 | A1* | 11/2001 | Ausems et al. | 455/556 |
| 2004/0137886 | A1* | 7/2004 | Ross et al. | 455/414.1 |
| 2005/0075115 | A1* | 4/2005 | Corneille et al. | 455/456.3 |

* cited by examiner

*Primary Examiner*—Temica Beamer
*Assistant Examiner*—Joy K. Contee
(74) *Attorney, Agent, or Firm*—Perman & Green, LLP

(57) ABSTRACT

A mobile telephone is configured to handle business relations and business activities. The telephone comprises means for receiving a command from a user via a user interface, means for acting on said command resulting in an activation of a functional unit comprising means for receiving user commands and data, means for manipulating said data, means for storing said data in any of a customer database, a resource booking database and a cash register database and means for presenting output data to the user.

15 Claims, 4 Drawing Sheets

MOBILE PHONE BUSINESS ADMINISTRATION TOOL

TECHNICAL FIELD

The present invention relates to a software application in a mobile telephone for handling business relations and business activities for small business operations.

BACKGROUND

Functions such as phone book, calendar, clock, calculator and reminder are commonly available in mobile phone terminals of today. Although being rudimental, they have until now provided users with administrative support when performing business in a small scale business operation.

An example of a mobile phone having such functionality is the Nokia 6250 GSM telephone, as described in it's user guide 9352583, issue 2.

However, there are a number of drawbacks related to mobile phones in the prior art when considering them as tools for handling business relations, resource bookings and cash register functions for a small business operation. Namely, it is often necessary to utilize other forms of tools together with the phone, such as a computer or note books. Needless to say, computers are expensive and note books are not very flexible.

Moreover, there is typically a lack of, co-operation and communication of information between different functions of the phone. Moreover, information input via the keyboard is usually cumbersome if not difficult.

SUMMARY OF THE INVENTION

It is hence an object of the present invention to overcome the drawbacks in prior art mobile phone functions, i.e. to solve a problem of how to enable small business operators to work more effectively.

The object is achieved in a first aspect by way of a mobile telephone according to claim 1 and in a second aspect by way of a method according to claim 4, through which a small business operator is able to keep track of business relations, bookings and handle a cash register.

A mobile telephone according to the present invention is configured to handle business relations and business activities. The telephone comprises means for receiving a command from a user via a user interface, means for acting on said command resulting in an activation of a functional unit comprising means for receiving user commands and data, means for manipulating said data, means for storing said data in any of a customer database, a resource booking database and a cash register database and means for presenting output data to the user.

Preferably, the mobile telephone further comprises means for exchanging data with a phonebook database and a calendar database.

The present invention extends the normally available functionality of a mobile phone to also include customer relation management (CRM) functionality, resource booking functionality and cash register functionality.

The CRM functionality allows small-scale business owners to control their business relations, such as customers and suppliers. With the help of the CRM function, a small business owner can keep track of what has been previously discussed with business relations, e.g. regarding previous time of contact, when to get in contact the next time, when to send birthday congratulations, etc. The CRM function may also be used to keep a register of useful notes associated with each business relation. These notes may, e.g. be in the form of claims, special treatment, etc.

The resource booking functionality allows the user to easily keep track of bookings for e.g. hotel rooms, sightseeing tours etc.

The cash register functionality allows the user to keep track of sales in, e.g., a small shop. It also helps the user doing calculation of the total price for purchases made by customers.

An advantage of the present invention is that it allows the users to gain more benefit of their mobile phone. This collection of functions postpones the need for a more complex and expensive solution in the form of, e.g., a PDA or a computer.

Moreover, telephone terminal users have for a long time been using calendar and reminder functions and also been writing notes with a text message (SMS) editor and adding entries in the calendar. Advantageously, this collection of applications allow a step up to electronic resource management for these users, without the disadvantages related to high costs.

DETAILED DESCRIPTION OF PREFERRED EMBODIMENTS

A communication device having business administration applications will now be described with reference to the appended drawings. The implementation of the invention in terms of software depends on the platform chosen, i.e. the operating system of the manufacturer of the phone and even on the specific type of phone. Communication between different functional modules in the software of the phone can be implemented by means of an internal software bus, message passing, shared memory or polling in a slave/master system. It should be noted, however, that no detailed description will be made of how the applications communicate with other applications in the phone.

Here the communication is effected via data communication protocols and other control software forming part of the operating system.

The present invention is intended for use in a relatively compact, portable communication device such as a communication terminal, particularly in the form of a cellular telephone.

Computer program code, which implements a method according to the invention, with or without program code of other functions of the business administration applications, may reside in fixed or removable memory of a device according to the invention. Any type of conventional removable memory is possible, such as a semi-permanent storage chip such as a flash memory card or "memory stick" etc. The program code of the invention may also be considered as a form of transmitted signal, such as a stream of data communicated via the Internet or any other type of communication network, including cellular radio communication networks of any kind, such as GSM/GPRS, UMTS, CDMA 2000 etc.

Figure 1:
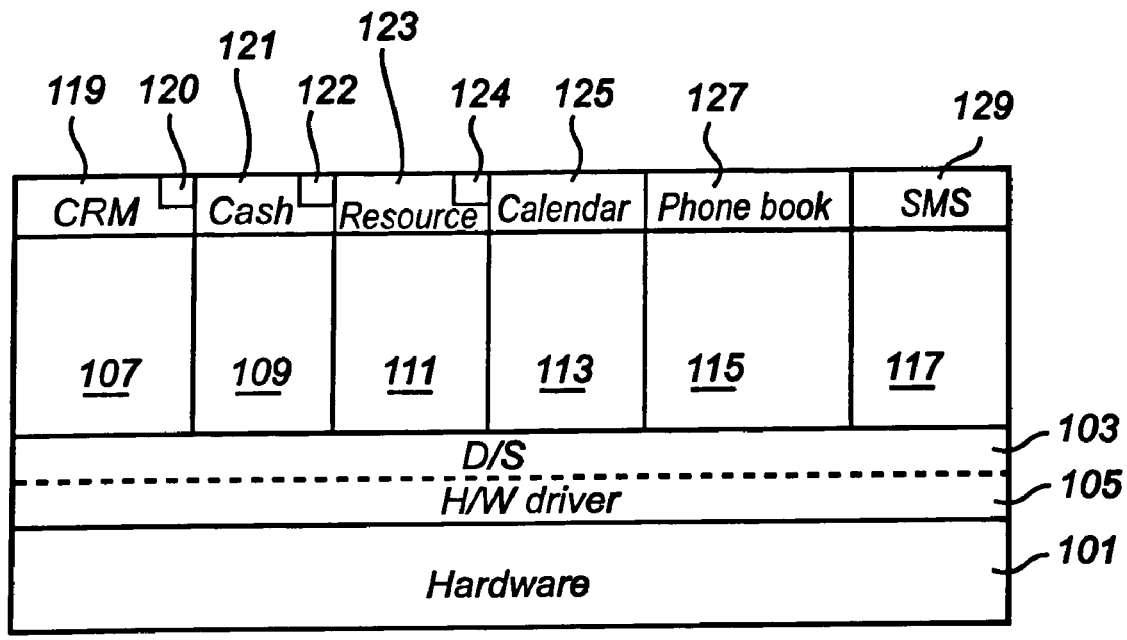
FIG. 1 shows schematically a view of software and hardware components comprised in an arrangement according to the present invention.

Turning now to FIG. 1, we see a view schematically depicting blocks of software and hardware components comprised in an arrangement according to the present invention. As will be discussed further below, the hardware components include a processor, memory and input/output hardware and is in FIG. 1 indicated by one single hardware block 101.

Located "on top" of the hardware block 101 is the software. An operating system 103 having specific functionality in the form of hardware drivers or controllers 105 to communicate with, and control, the hardware 101. As the skilled person realizes, the operating system is resides generally in a more or less protected part of the memory of the device. To exemplify, the operating system 103 may be one specifically adapted for use in PDA's or mobile communication terminals such as Symbian.

On top of the operating system 103 are a number of protocol stacks indicated, a first stack 107 at the top of which is a CRM application 119 comprising a CRM database 120, a second stack 109 on top of which is a cash register application 121 comprising a cash register database 122 and a third protocol stack 111 on top of which is a resource booking application 123 comprising a resource booking database 124.

Three additional stacks and applications are also shown. A fourth protocol stack 113, on top of which is a calendar application 125, a fifth protocol stack 115, on top of which is a phone book application, or database, 127 and a sixth protocol stack 115, on top of which is a Short Message Service (SMS) application 129.

As will be described in some more detail below, the software components 105, 119, 121, 123, 125, 127 and 129 operate and communicate with each other, and with the operating system 103, through the protocol stacks 107, 109, 111, 113, 115 and 117. Although, as the skilled person will understand, the protocol stacks 107, 109, 111, 113, 115 and 117 may also be one single stack and the application modules 119, 121, 123, 125, 127 and 129 communicating directly within that single stack.

Figure 2:
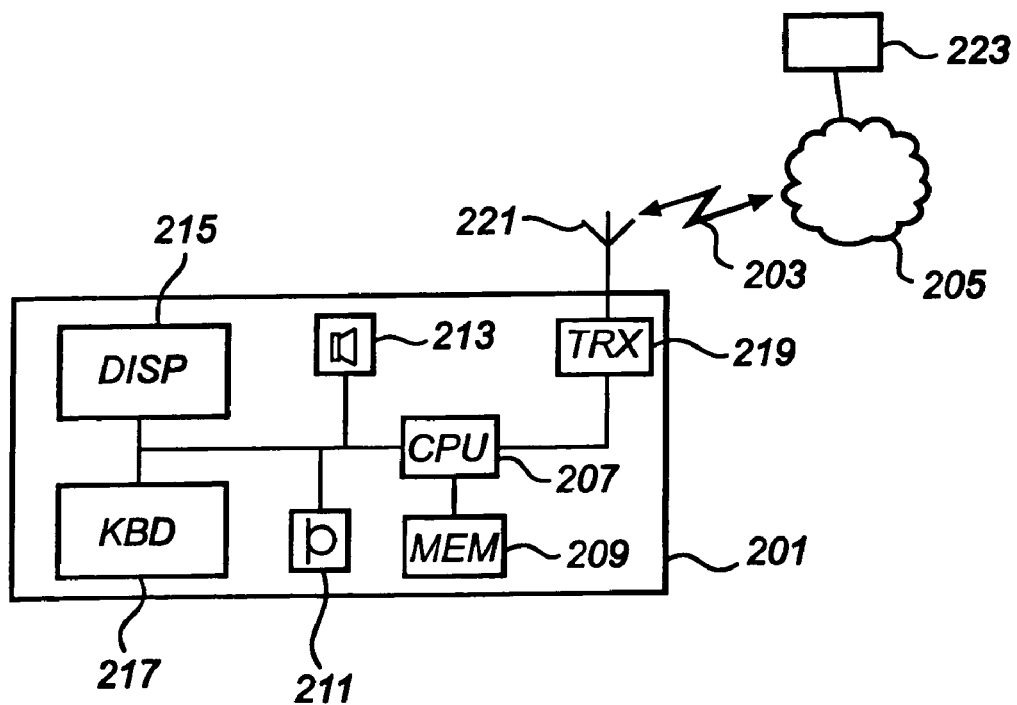
FIG. 2 shows schematically a block diagram of a portable communication terminal according to the present invention.

FIG. 2 illustrates schematically a communication terminal 201 in which the present invention is implemented. The terminal 201 is capable of communication via an air interface 203 with a radio communication system 205 such as the well known systems GSM/GPRS, UMTS, CDMA 2000 etc. The terminal comprises a processor 207, memory 209 as well as input/output units in the form of a microphone 211, a speaker 213, a display 215 and a keyboard 217. Radio communication is realized by radio circuitry 219 and an antenna 221. The details regarding how these units communicate are known to the skilled person and is therefore not discussed further.

The communication terminal 201 may for example be a mobile telephone terminal or a PDA equipped with radio communication means. The method according to the present invention will in general reside in the form of software instructions, together with other software components as described in connection with FIG. 1, in the memory 209 of the terminal. The software instructions of the inventive notification function may be provided into the memory 209 in a number of ways, including distribution via the network 205 from a software supplier 223.

Customer Relations Management

The CRM application 119 links, i.e. is capable of exchanging data and communicate, with the phonebook application 127 and exchange entries present within the phone book. The CRM application is also capable of tracking, i.e. logging, events such as: SMS in/out, call in/out, etc. as well as credit/debit for each customer.

The CRM application 119 also links with calendar entries in the calendar application 125 such as last meetings and next meetings. The CRM application 119 also allows a user to enter coming actions points into its database 120, i.e. what you have promised, what was promised to you and next contacts to be taken. Also family information such as birthdays and other important dates may be entered into the CRM data base 120.

FIGS. 3a–3d illustrate a simple use case of the CRM application 119. A mobile phone 300 comprises a display 302, a first selection key 304, a second selection key 306, a display scroll up key 308 and a display scroll down key 310.

The selection keys 304, 306 are used by a user to confirm different actions to the control software of the phone. Each selection key 304, 306 is associated with a respective display selection 312 and 214 on the display 302. In this case a first display selection 312 is denoted "SELECT" and a second display selection 314 is denoted "EXIT".

Figure 3A:
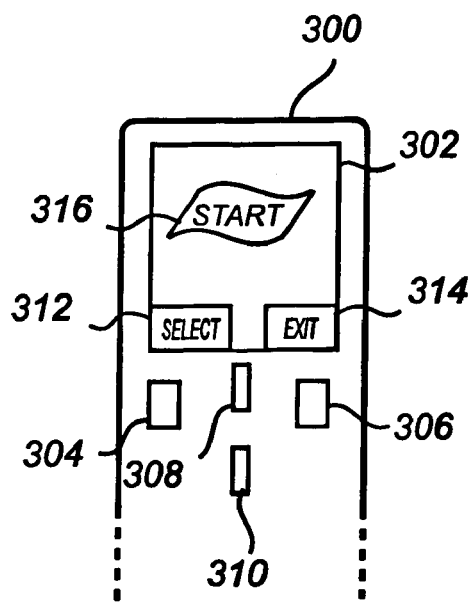
FIGS. 3*a*–3*d* illustrate the use of a CRM function in a mobile telephone according to the present invention.

FIG. 3a shows an initial state where the user is prompted, via a prompting display symbol 316 denoted "START", to select the CRM application by pressing the first selection key 304.

Figure 3B:
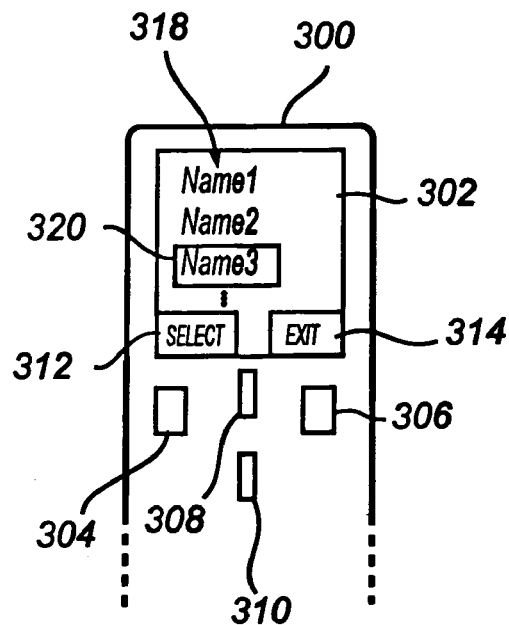

FIG. 3b shows the situation when the CRM application has started and is displaying a list of names 318 on the display 302. One name 320 has been highlighted due to an action by the user of pressing the scroll display keys 308, 310 so as to highlight the name 320.

Figure 3C:
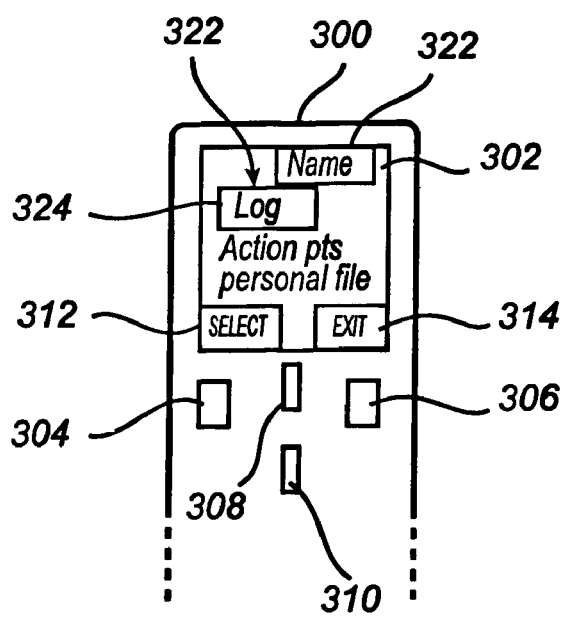

FIG. 3c shows the situation when the user has pressed the selection key 304 and the CRM application has responded by displaying the selected name 322 as well as a menu of actions 322 to perform on information associated with the selected name, which the user may select from by manipulating the scroll display keys 308, 310. In this case, the user has selected an action denoted "Log" 324, which is highlighted on the display 302.

Figure 3D:
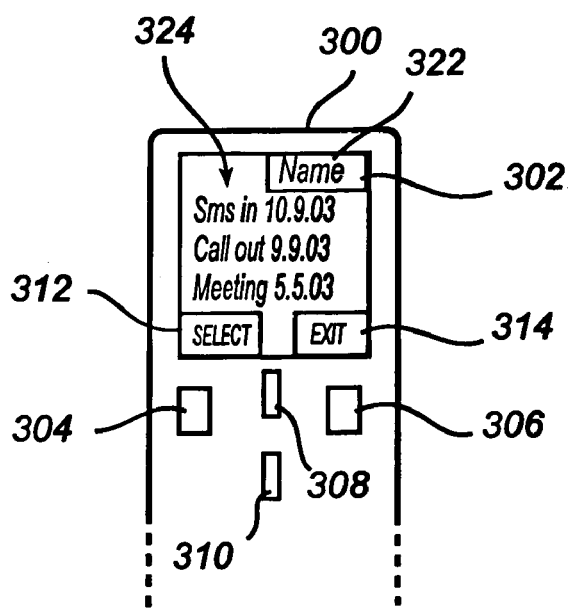

FIG. 3d shows the situation when the user once again has pressed the selection key 304 and the CRM application has responded by displaying logging information 324 associated with the selected name 322. In this case the logging information 324 is a list of events, including "SMS in 10.09.03", Call out "09.09.03" and "Meeting 05.05.04".

Cash Register Functionality

The cash register application 121 comprises a plurality of functions that enable the user to use the mobile phone as a simple tool when performing sales to customers.

It is preferred that simple typing of numbers is very easy. Addition of numbers is preferably easy (e.g. a single-press of the *-key results in the execution of '+', i.e. addition.

The result for one 'sale' is displayed all the time in the display; also during the calculation (this is advantageous in that it indicates to the customer how much he/she has spent so far.

Calculating an 'intermediate result' or 'Sub-total' (the addition for one customer) is also preferably made easy (e.g. this may be a first option on an options-list presented on the display and/or on a special key.

It is possible to calculate money back needed. For example, if the total amount for a sale is 8.80, and the ustomer pays 10, then the user can type '10' and get the result '1.20'.

The application also allows multiplying of several items, e.g. when a customer buys a number X of apples.

The application also allows presentation of a total of all sales during a specified period of time. For example, one days sales. Additionally, a total for one months sales can be presented.

Preferably, the total sales of one day or month etc is hidden, i.e. not shown on the display at all times. The user is able to show the total without revealing the total sales to unauthorized viewers.

A plurality of levels of 'cost' is available, e.g. cost of a single item, cost of multiple items (e.g. 5 apples), cost of all items for one customer, today's total, and this months total. Date and time stamp for all levels is also included.

In general, the application makes it easy for the user to undo/delete previous items entered. Moreover, labelling support is also included in the functionality (e.g. "Clothes", "Groceries"). These labels may be defined by the user himself/herself. Nevertheless, a number of predefined items (e.g. apples=99 cent) are initially included in the application.

Other functions include bar code reader support, currency conversion. Also, coin sizes are definable. This feature is used for proposing correct change to give back to a customer when he/she pays. Tax addition/subtraction is also included in a way that the user defines beforehand whether there should be added tax at the end of all calculations.

Reports, including graphical curves relating to sales for the month is also provided. Cash balance can be entered initially and be viewed at any time later.

In order to simplify input, the invention allows the user to exchange the 'period' (.) with a currency sign, e.g. £, $ or always put in at the end etc. Also, settings are available to avoid no use of the comma (e.g. like prior art cash registers where the user always needs to press '00' to fill in the digits are the comma. It also allows the user to define the number of digits after the comma (e.g., no digits, 1, 2 or 3).

An "Add to credit" option is also available, which allows the user to save 'sub total' associated with a person in phone book 127 or CRM database 120.

Figure 4A:
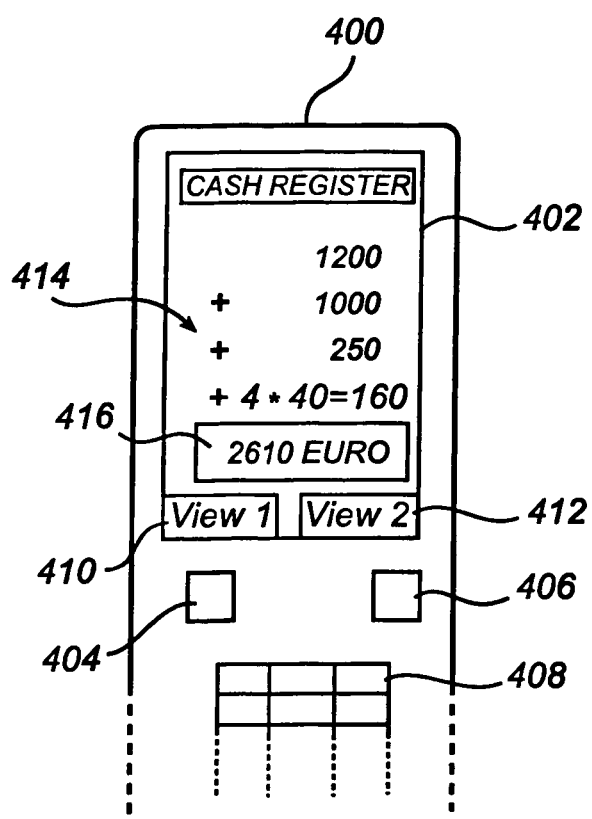
FIGS. 4*a* and 4*b* illustrate the use of a cash register function in a mobile telephone according to the present invention.
Figure 4B:
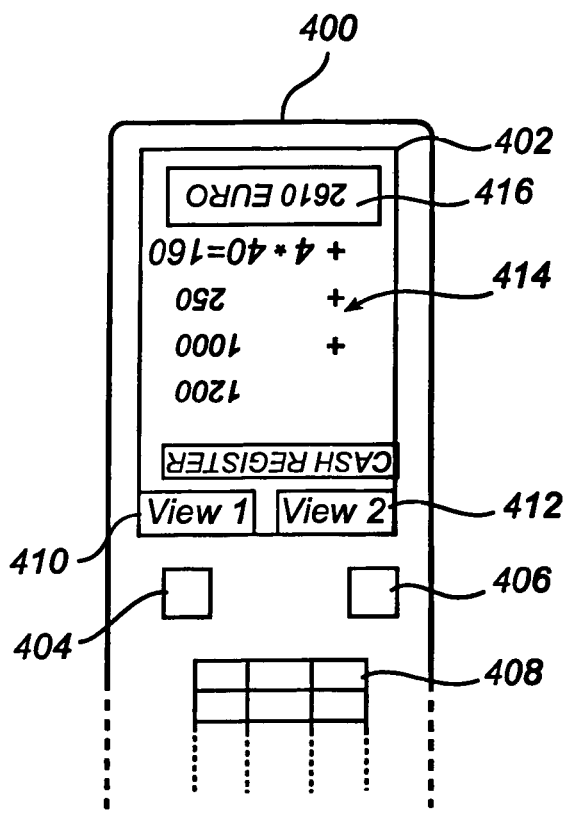

FIG. 4a and FIG. 4b illustrate an example of output in a simple use case of the cash register application 121. Similar to the CRM application, described above, the cash register application makes use of a number of keys on a mobile phone 400 having a display 402. The phone 402 comprises a first selection key 404 and a second selection key 406, as well as other keys 408 that include keys for entering numerical values and symbols. The selection keys 404, 406 correspond to a respective view selection display 410 and 412, denoted "View 1" and "View 2", respectively.

FIG. 4a shows a situation where the user has selected, by pressing the first selection key 404, a normal display view where text and numbers are displayed on the display 402 in a normal upright manner, easily readable by the user himself/herself. As illustrated in FIG. 4a, the user has entered a number of addition operations 414 using the numerical and symbol keys 408. The cash register application calculates and displays a total sum 416, displayed in a large font at the bottom of the display 402.

FIG. 4b shows a situation when the user has pressed the second selection key 406, corresponding to the second view selection 412. The cash register application has responded by rotating the content of the display 414, 416 180 degrees in order to make it easy for a person being in a position opposite to the user of the phone to read the content of the display.

The view selection display 410 and 412 remain in the same position on the display, which facilitates for the user to switch back to a normal view by pressing the second view selection key 406.

Resource Booking Functionality

The resource booking application 123 is designed around a calendar/dates application. For each day the user can easily define bookings, including adding names and contact information for bookings for each day, keep track of 'room numbers' for each booking in the case of a hotel use case. The resource booking application 123 is also capable of keeping track of 'bus ride' for each booking, in the case of a sightseeing use case, as well as keeping track of multiple bookings per day, e.g. if there are multiple bus rides every day. The application enables a user to easily define a customer to have multiple bookings, e.g. allowing a hotel room booking over several days or similar.

Figure 5:
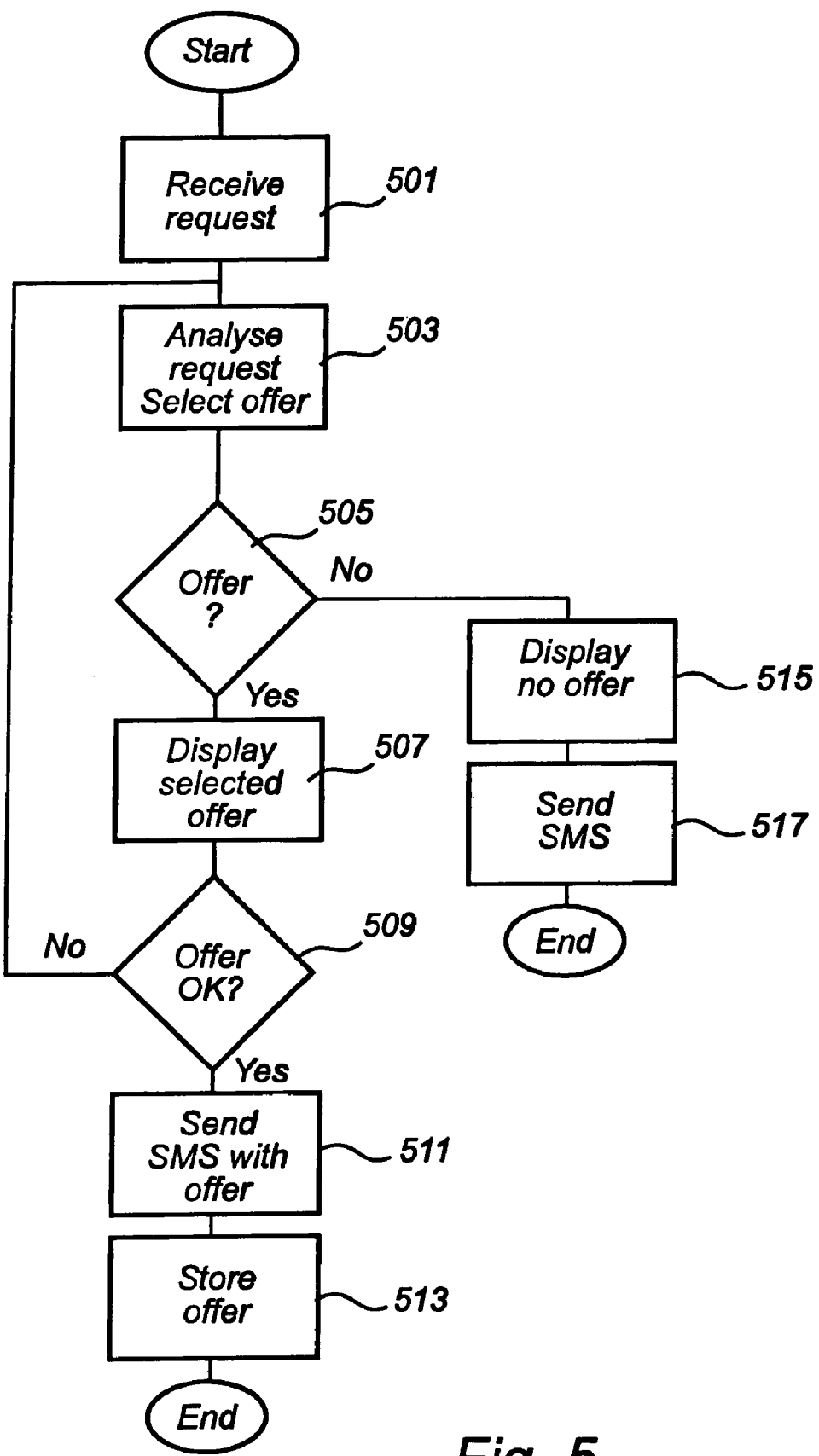
FIG. 5 is a flow chart of a resource booking function of the present invention.

FIG. 5 shows a flow chart of a resource booking procedure.

In a receive step 501, a booking request is received by means of, e.g., a SMS from a customer. The request may include a request for a hotel room specifying also the number of people as well as dates. In an analysing step 503, the received request is analysed by way of comparing the details of the request with information stored in databases in the telephone, resulting in an offer. In a decision step 505, it is decided, based on the offer from the analysis, how to proceed the booking procedure. If the analysis reveals that the request can not be met, a message is displayed to the user in a display step 515 and a message, e.g. a SMS, is sent to the customer in a send message step 517 informing the customer of the fact that the request could not be met. If the analysis reveals that the request can be met, a message is displayed to the user in a display step 507. The user is asked, in a selection step 509, if the offer is acceptable. If the user decides that the offer is acceptable, the offer is sent to the customer in a send offer step 511 and the offer is stored in the database in a storage step 513. The storage in step 513 can be performed by utilizing the booking database and/or any other of the databases, e.g. the calendar and the CRM database. Details regarding payment etc. can also be stored, e.g. in the CRM database or the cash register database, during this storage step 513.

The messages received and transmitted during steps 501 and 511, respectively, during the procedure described above may look as follows:

```
BEGIN SMSBOOKING
    REQUEST
        <DATE>     ( 2003-12-24 )
        <END DATE>  ( 2003-12-28 )
        <OBJECT>    ( ROOM
    [ROOM/TRIP/CAR/CABIN/TABLE/DIVEGEAR/...])
        <PARAM 1>   ( 2 = NBR OF PEOPLE
    [SIZE/DESTINATION/...] )
        ...
        <PARAM n>   ( VISA = PAYMENT BY
    VISA CARD )
END SMSBOOKING
which would get a reply, i.e. the message
sent during step 511:
BEGIN SMSBOOKING
    REPLY
        <STATUS>        ( OK )
```

-continued

```
<DATE>      ( 2003-12-24 )
<END DATE>   ( 2003-12-28 )
<OBJECT>    ( ROOM 203 )
<PARAM 1>   ( PRICE = 200 )
...
<PARAM n>   ( TEXT: "We confirm
your booking of room nbr 203 for the dates
2003-12-24 to 2003-12-28. The total price
will be 200 $ (4 × 50 $) which wiol be
deducted from your VISA card upon check out.
Earliset checking in time is 12:30 2003-12-
24" )
END SMSBOOKING
```

The text will be displayed to the customer. Naturally the reply could be sent as a normal SMS message as well only containing the text string. The text within paranthesis are alternatives specific to this example. The text within square brackets are other possible alternatives. The text within angular brackets are other possible application specific data, to which also parameters may be specified.

Application Interaction

Other embodiments of the present invention may include further interaction, including communication, between the different applications discussed above. For example, interaction between the customer relationship functionality and the cash register functionality may be utilized to keep track of due dates for payment of invoices related to purchases made by a specific customer during use of the cash register. Similarily, interaction between the customer relationship functionality and the resource booking functionality may be utilized to keep track of due dates for payment of invoices related to bookings made by a specific customer during use of the resource booking functionality. Moreover, interaction between the customer relationship functionality and the resource booking functionality may involve exchange of data regarding specific customers preferences regarding booking alternatives etc.

The invention claimed is:

1. A mobile telephone configured to handle business relations and business activities, said telephone comprising means for:
   receiving a command from a user via a user interface,
   acting on said command resulting in an activation of a functional unit comprising means for:
   receiving user commands and data,
   manipulating said data,
   storing said data in any of a customer database that can at least track customer/supplier data exchanges and credit/debit amounts, a resource booking database that can at least track available business resources and customer requests for those resources and a cash register database that can at least track sales and generate sales reports,
   presenting output data to the user.

2. A mobile telephone according to claim 1, further comprising means for:
   exchanging data with a phonebook database.

3. A mobile telephone according to claim 1, further comprising means for:
   exchanging data with a calendar database.

4. A mobile telephone according to claim 1, further comprising means for:
   exchanging data between any of the customer database, the resource booking database and the cash register database.

5. A method for handling business relations and business activities in a mobile telephone, said method comprising:
   receiving a command from a user via a user interface,
   acting on said command resulting in an activation of a functional unit capable of:
   receiving user commands and data,
   manipulating said data,
   storing said data in any of a customer database for at least tracking customer/supplier data exchanges and customer credit/debit amounts, a resource booking database for at least tracking available business resources and customer requests for those resources and a cash register database for at least tracking sales and generating sales reports,
   presenting output data to the user.

6. A method according to claim 5, further comprising:
   exchanging data with a phonebook database.

7. A method according to claim 5, further comprising:
   exchanging data with a calendar database.

8. A method according to claim 5, further comprising:
   exchanging data between any of the customer database, the resource booking database and the cash register database.

9. A mobile telephone according to claim 1, further comprising means for rotating an orientation of a content of a display of the mobile telephone substantially 180° to enable a person in a position opposite from an operator of the mobile phone to read the content.

10. A mobile telephone according to claim 1, further comprising means for the resource booking database to compare a customer request with information stored in at least one database within the telephone to determine if the request can be met.

11. A mobile telephone according to claim 1, further comprising means for the customer database to display logging information corresponding to a selected name.

12. A method according to claim 5, further comprising rotating an orientation of a content of a display of the mobile telephone substantially 180° to enable a person in a position opposite from an operator of the mobile phone to read the content.

13. The method according to claim 12 further comprising activating a function in a cash register application of the mobile telephone to rotate the orientation of the display.

14. A method according to claim 5, further comprising comparing a customer request with information stored in at least one database within the telephone to determine if the request can be met.

15. A method according to claim 5, wherein presenting output data to the user includes at least displaying logging information corresponding to a selected name.

* * * * *